April 14, 1959 — L. G. VOGEL — 2,881,463
APPARATUS FOR WASHING CONVEYORS AND THE LIKE
Filed Feb. 27, 1956 — 5 Sheets-Sheet 1

Inventor:
Leo G. Vogel,
by Albert Spain
Attorney

April 14, 1959 L. G. VOGEL 2,881,463
APPARATUS FOR WASHING CONVEYORS AND THE LIKE
Filed Feb. 27, 1956 5 Sheets-Sheet 3

Inventor:
Leo G. Vogel,
by Albert Spear
Attorney

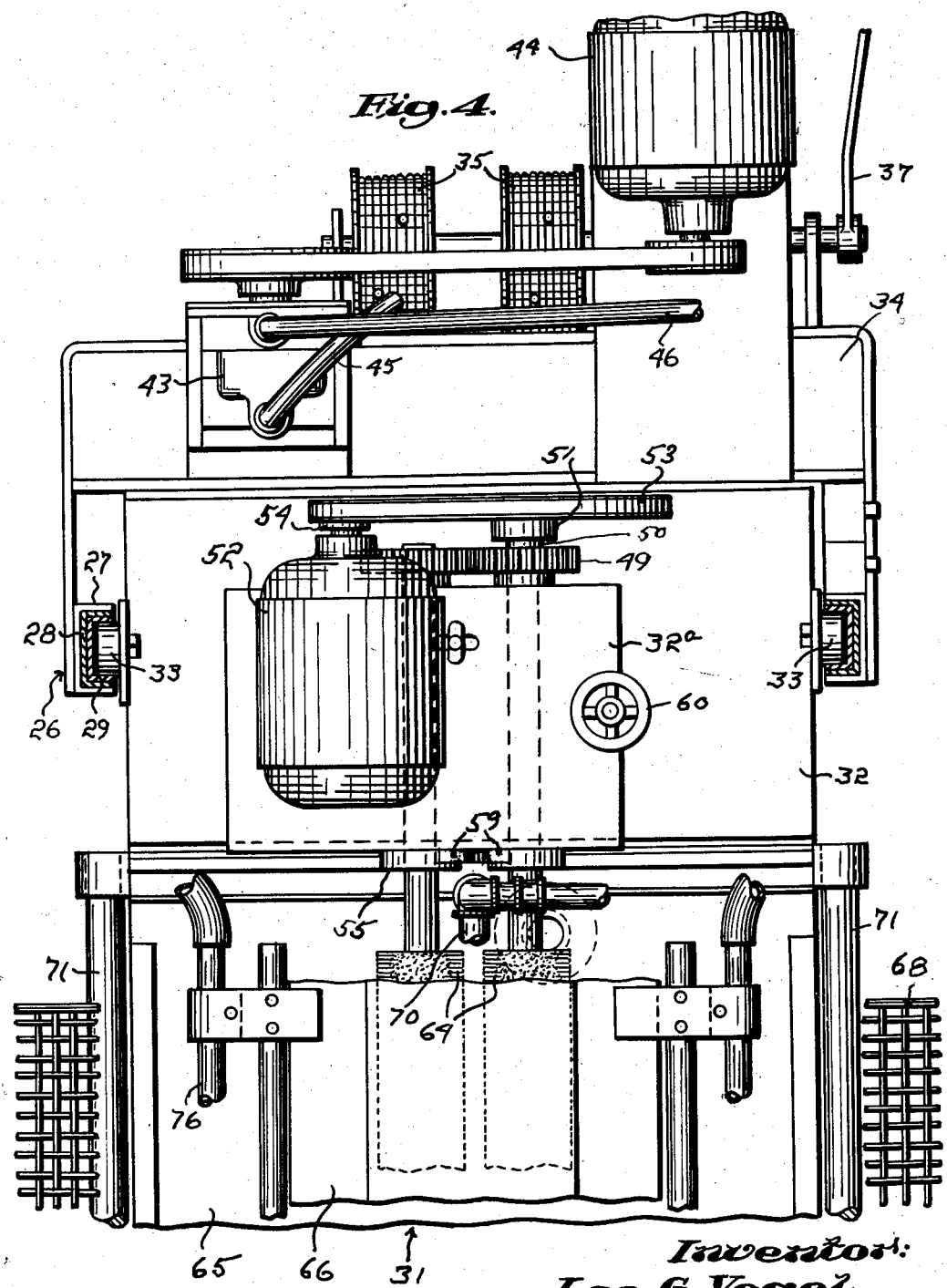

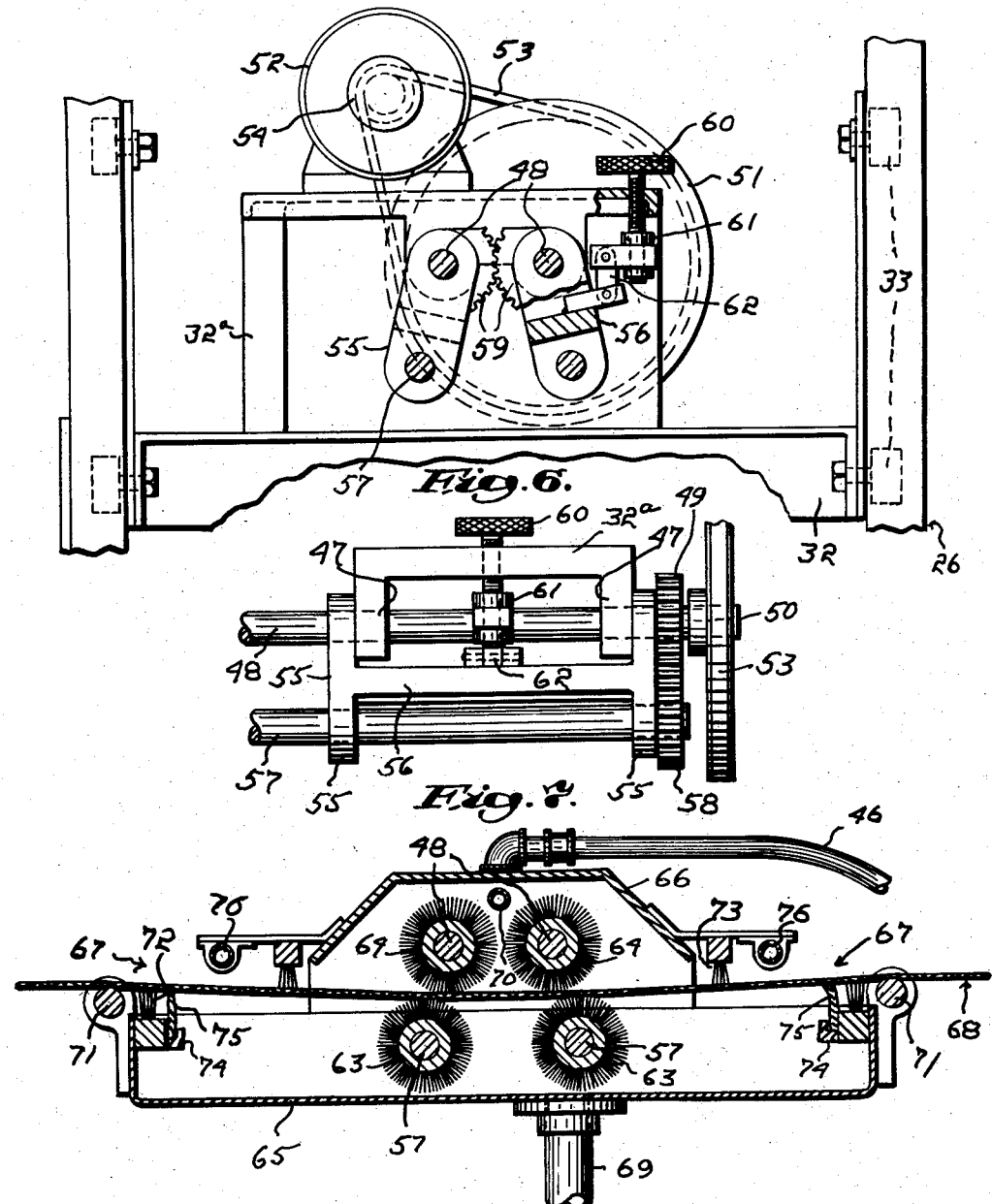

United States Patent Office 2,881,463
Patented Apr. 14, 1959

2,881,463

APPARATUS FOR WASHING CONVEYORS AND THE LIKE

Leo G. Vogel, Portland, Maine

Application February 27, 1956, Serial No. 567,837

7 Claims. (Cl. 15—302)

The present invention relates to apparatus for use in washing endless conveyors and the like.

While apparatus in accordance with the invention is adapted for other uses, the invention is discussed herein with particular reference to the cleansing of such conveyors as are employed in the processing of food products. By way of example, there are usually a number of endless conveyors in a typical bakery that require thorough cleansing and, commonly, the height of conveyor courses relative to the floor varies considerably in areas where they are accessible for cleaning. The general objective of this invention is to provide means for cleansing such conveyors efficiently and economically.

This objective is attained by providing apparatus comprising a washing head provided with upper and lower rotary brushes and an entrance slot enabling the head to be positioned from one side of a conveyor course to bring said brushes into engagement with opposite surfaces thereof, brush rotating means, and means to circulate a liquid to and from said head. Apparatus may also include one or more liquid tanks and a head support that is, desirably, vertically adjustable.

With such apparatus, the conveyor may be washed with the apparatus in position and the conveyor in motion. In order to avoid spread of the liquid by travel of the conveyor, the upper and lower portions of the head are housings with the lower portion being a liquid collector dimensioned to underlie a greater length of the straddled conveyor than is covered by the upper head portion at least with reference to the outfeed side of the head. Means are employed to remove free moisture from the upper end preferably both surfaces of the conveyor and such means may comprise, between the outfeed side of the head portions, stationary brushes, air spray means, or both and, for belting, such as canvas and rubber belting, squeegees.

With such apparatus, a conveyor, regardless of its height from the floor, may be quickly, thoroughly and economically cleaned at any point in the plant with the liquid or liquids being so controlled as to avoid damage or the creation of messy conditions thereby.

In the accompanying drawings there is shown an illustrative embodiment of the invention from which these and other of its objectives, novel features, and advantages will be readily apparent.

Figure 1:
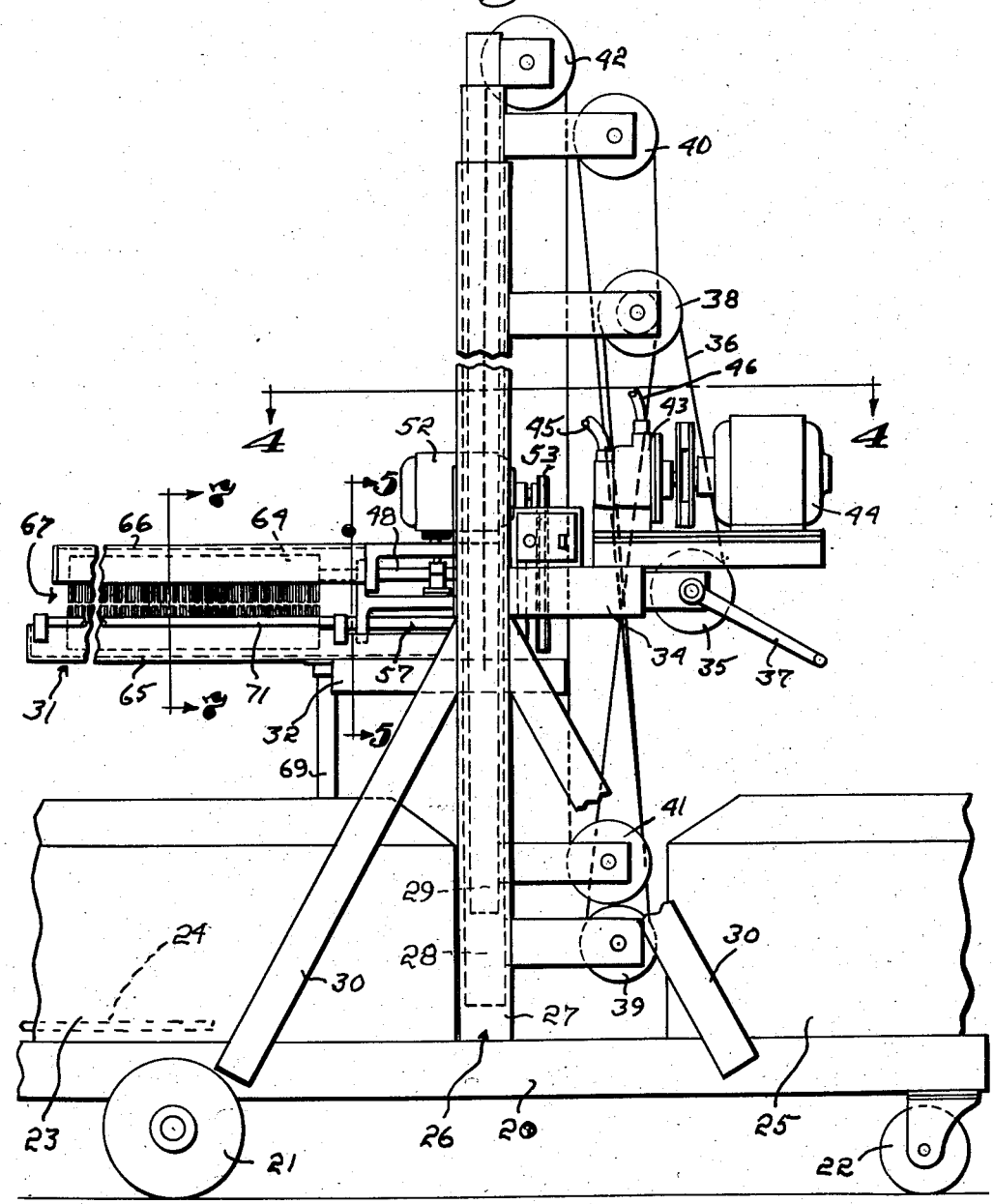
Fig. 1 is a side view of apparatus in accordance with the invention with the washing head in its lowermost position.
Figure 2:
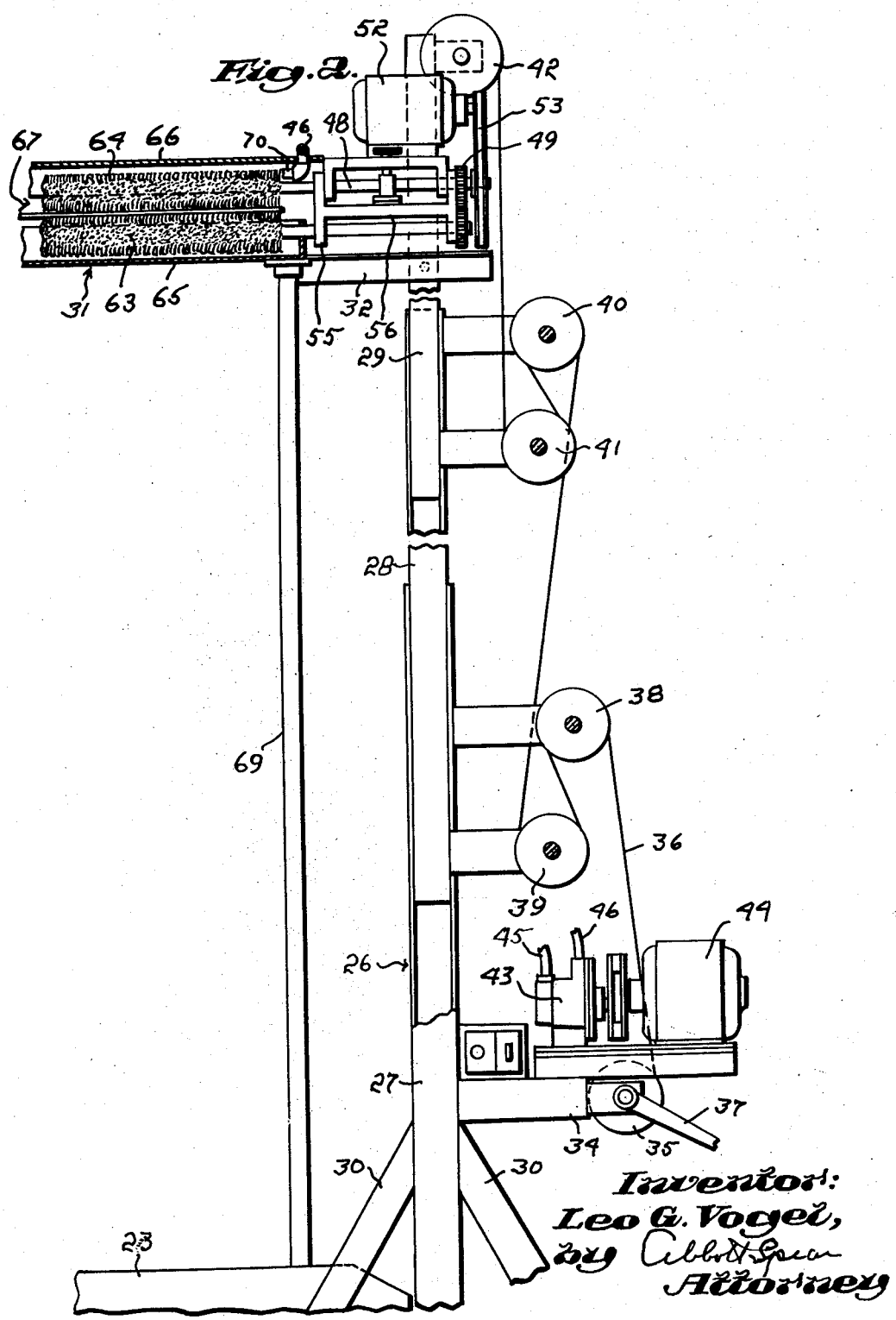
Fig. 2 is a similar, fragmentary view showing the washing head in an elevated position and with its supports extended.
Figure 3:
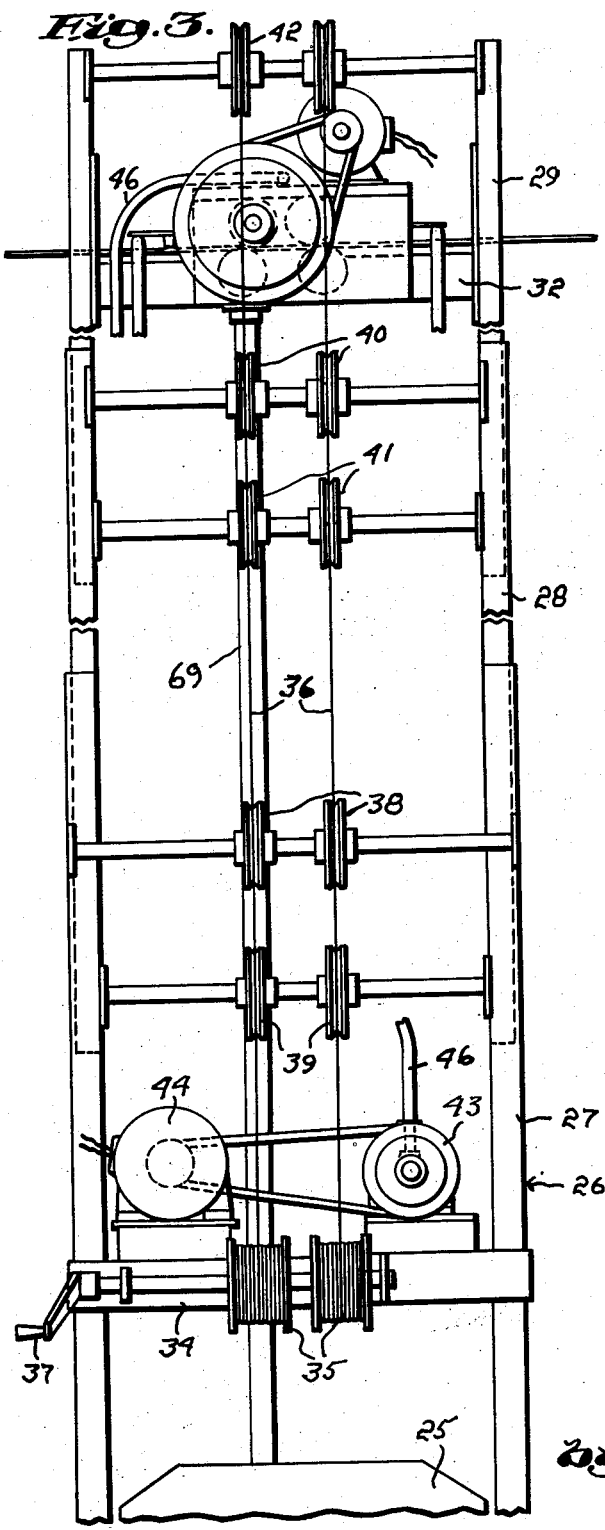
Fig. 3 is a view of the windlass end of the apparatus, positioned as shown in Fig. 2.

Figs. 4 and 5 are sections, on an enlarged scale, taken along the indicated lines 4—4 and 5—5 of Fig. 1, and Fig. 6 is a fragmentary side view of the connection between the brush supporting shafts, and Fig. 7 is a fragmentary section taken along the indicated lines 7—7 of Fig. 1.

In the embodiment of the invention illustrated by the drawings, a base 20 supported by wheels 21 and casters 22 is provided with a wash water tank 23 having an indicated heating element 24 and a rinse water tank 25. Centrally of the base 20, there are a pair of generally indicated standards 26, each shown as having three parts 27, 28, and 29. Each standard part is of U-shaped section with the parts 27 being connected to the base 20 and suitably braced as at 30. Each part 28 is dimensioned to slidably enter a part 27 and to slidably receive a part 29.

A washing head 31 has a mount 32 provided at each side with a vertically alined pair of rolls 33, each pair being entrant of a channel defined by a standard part 29 while a supporting platform 34 is secured to the standard parts 27 and is provided with windlasses 35 for the pair of cables 36 and rotated by the common crank 37. Each cable 36 is connected to the mount 32 and trained about pulleys 38, 39, 40, 41 and 42. The pulleys 38 are carried adjacent the upper ends of the standard parts 27 while the pulleys 39 and 40 are mounted proximate the lower and upper ends, respectively, of the standard parts 28 and the pulleys 41 and 42 are mounted proximate the lower and upper ends, respectively, of the standard parts 29. By these or equivalent means, rotation of the windlasses 35 in one direction or the other raises or lowers the head 31 and extends or shortens the standards 26.

The platform 34 also supports a pump 43 shown as driven by the motor 44 and having a flexible intake 45 adapted to be inserted in either tank and a flexible delivery conduit 46 secured to the head 31 and of sufficient length to enable the standards 26 to be fully extended.

The head mount 32 has a support 32a provided with alined pairs of depending flanges 47 in which a pair of parallel shafts 48 are suitably journalled. At their rear ends, the shafts 48 are furnished with meshing gears 49 of which one is axially connected as at 50 to a pulley 51. A motor 52 is mounted on the upper surface of the support 32a and a belt 53 is trained over the pulley 51 and the drive pulley 54 of the motor 52.

A pair of link members 55, interconnected as at 56, are rotatably supported by the shafts 48 and a shaft 57 is suitably journalled in the free ends of each pair of link members 55. At their rear ends, the shafts 57 are provided with gears 58 each meshing with a respective one of the gears 49. At the other end, the links 55 have meshing gear segments 59 so that movement of one of them in one direction will be attended by equal but opposite swinging motion in the opposite direction.

Threaded through the support 32a is a screw 60 having a part 61 with reference to which the screw 60 may be independently turned and which pivotally supports a link 62 pivotally connected to the interconnecting part 56 of one pair of link members 55. By this arrangement, a pair of link members may be swung from a first position in which the gears 58 mesh with one another, upwardly and away from each other thus to decrease the distance between a plane inclusive of the axes of both shafts 57 and a plane inclusive of the axes of both shafts 48.

Fast on the shafts 57 and 48 are brush elements 63 and 64, respectively, and these are within housing members 65 and 66, respectively, attached at their rear ends, to the head mount 32. The members 65 and 66 are vertically spaced apart to provide a transverse slot, generally indicated at 67 and extending from side-to-side and opening through the front of the head to encircle it to straddle a conveyor course 68 from whichever side thereof affords the most convenient access thereto. The housing member 65 is also a liquid collector and has a flexible drain 69 of sufficient length to reach either tank when spaced a maximum distance thereabove while the housing member 66 has a spray bar 70 connected to the delivery conduit and disposed to spray liquid against both of the brushes 64.

The housing member 65 is dimensioned to underlie a greater length of a straddled conveyor course than is covered by the upper housing member 65 with reference to the side or sides of the head 31 that are outfeed sides. Usually, as shown in the drawings, either side must be adapted to be the outfeed side, and accordingly both sides of the member 65 are spaced beyond the corresponding sides of the members 66. Adjacent each side of the member 65 there are conveyor supporting rollers 71. Usually a conveyor is washed by advancing it through the head and as a result, means must be employed to prevent the moving conveyor from also carrying and spreading free moisture that might cause damage or create a messy condition. This factor is likewise important if the washing head is advanced relative to a straddled conveyor course.

For this reason, there are shown opposed stationary brushes 72 and 73 carried by the proximate edges of the housing members 65 and 66 and adjacent each is shown a clip 74 for a squeegee element 75 for use where the conveyor is a canvas, rubber or like belt. Air may also be used and for this purpose there are shown air lines 76 having ports disposed to direct the air against the upper surface of the straddled conveyor.

It will be noted that both the upper end lower pair of brushes rotate towards each other and this has proved to be advantageous as any pulling of the conveyor is avoided while ensuring that the straddled position thereof is thoroughly scrubbed.

In practice, the washing head 31 is positioned to straddle a conveyor course while it is stationary. The conveyor may then be started and water delivered to the head 31 and there collected after use and passed through the drain 69. In the embodiments of the invention shown in the drawings, wash and rinse sources are provided so that after thorough washing, the conveyor may be as thoroughly rinsed. Adjustability of the brushes relative to each other is also important as it enables the working head to be adapted for use with conveyors of different types and different thickness.

What I therefore claim and desire to secure by Letters Patent is:

1. In a washer for a conveyor of the endless type having a horizontal section, a washing head including upper and lower housing portions, a pair of conveyor supports, one at each side of said lower portion, said portions being arranged and disposed to establish a transverse slot extending from side-to-side of said head and opening through the front thereof to enable said section of the conveyor to be straddled, from one side and to bring said supports into supporting engagement with the straddled conveyor, brushes rotatably mounted in said head between said supports for engagement with opposite surfaces of the straddled conveyor, means to deliver water to both of said surfaces in zones proximate to said brushes, the lower housing portion including a drain and constituting a liquid collector extending approximately between said supports, and means between said brushes and said supports to remove water from both of said surfaces.

2. In a washer for a conveyor of the endless type having a horizontal section, a washing head including upper and lower housing portions, a pair of conveyor supports, one at each side of said lower portion, said portions being arranged and disposed to establish a transverse slot extending from side-to-side of said head and opening through the front thereof to enable said section of the conveyor to be straddled, from one side and to bring said supports into supporting engagement with the straddled conveyor, brushes rotatably mounted in said head between said supports for engagement with opposite surfaces of the straddled conveyor, means to deliver water to both of said surfaces in zones proximate to said brushes, the lower housing portion including a drain and constituting a liquid collector extending approximately between said supports, and means between said brushes and at least one of said supports to remove water from both of said surfaces.

3. In a washer for a conveyor of the endless type having a horizontal section, a washing head including upper and lower housing portions, a pair of conveyor supports, one at each side of said lower portion, said portions being arranged and disposed to establish a transverse slot extending from side-to-side of said head and opening through the front thereof to enable said section of the conveyor to be straddled, from one side and to bring said supports into supporting engagement with the straddled conveyor, a pair of rotatable brushes in said head for engagement with opposite surfaces of the straddled conveyor, adjustable means carried by one of said housing portions supporting said brushes to enable their vertical spacing to be varied as required by the thickness of the conveyor, means to deliver water to both of said surfaces in a zone approximately to said brushes, the lower housing portion including a drain and constituting a liquid collector extending approximately between said supports, and means between said brushes and at least one of said supports to remove water from both of said surfaces.

4. In a washer for a conveyor of the endless type having a horizontal section, a washing head including upper and lower housing portions, a pair of conveyor supports, one at each side of said lower portion, said portions being arranged and disposed to establish a transverse slot extending from side-to-side of said head and opening through the front thereof to enable said section of the conveyor to be straddled, from one side and to bring said supports into supporting engagement with the straddled conveyor, upper and lower pairs of brushes in said head for engagement with opposite surfaces of the straddled conveyor, means carried by one of said housing portions rotatably supporting said pairs of brushes in vertically spaced relationship to each other, means to deliver water to both of said surfaces in zones proximate to said brushes, the lower housing portion including a drain and constituting a liquid collector extending approximately between said supports, and means between said brushes and said supports to remove water from both of said surfaces.

5. In a conveyor washer, a tank, a pump having its intake in communication with said tank, a washing head movable vertically towards and away from said tank, said head having a transverse slot extending from side-to-side and opening through the front thereof and dimensioned to enable said head to straddle, from one side, a horizontal moving conveyor course, rotatable brushes in said head arranged to receive between them and engage the opposite surfaces of a straddled conveyor, both the upper and lower portions of said head being housings with the lower portion also being a liquid collector dimensioned to underlie a greater length of the straddled conveyor than is covered by said upper portion at least with reference to the outfeed side of said head, means between the outfeed sides of said portions for removing free moisture from said conveyor, a flexible conduit connecting the outlet of said tank to said head, and a flexible drain connecting said lower portion to said tank.

6. In a conveyor washer, a pair of tanks, a pump provided with an inlet connectable to either tank, a washing head movable vertically towards and away from said tanks, said head having a transverse slot extending from side-to-side and opening through the front thereof and dimensioned to enable said head to straddle, from one side, a horizontal moving conveyor course, rotatable brushes in said head arranged to receive between them and engage the opposite surfaces of a straddled conveyor, both the upper and lower portions of said head being housings with the lower portion also being a liquid collector dimensioned to underlie a greater length of the straddled conveyor than is covered by said upper portion at least with reference to the outfeed side of said head, a flexible conduit connecting said pump to said head, and a flexible drain carried by said lower portion and disposable in communication with either tank.

7. In a conveyor washer, a base including at least one tank, a washing head having a transverse slot extending from side-to-side and opening through the front thereof and dimensioned to enable said head to straddle, from one side, a horizontal conveyor course, rotatable brushes in said head arranged to receive between them and engage the opposite surfaces of a straddled conveyor, a drive for said brushes including a motor, extensible standards on said base supporting said head for vertical movement relative thereto at one side thereof and with said motor located between them, means operably connected to said head and said standard to effect said vertical movement of said head and to extend and shorten said standards, and means to circulate liquid between said tank and said head including a pump and a motor drive therefor supported by said standards at the other side thereof, said head including housing members of which one is arranged as a liquid collecting pan constituting part of said circulating means.

References Cited in the file of this patent
UNITED STATES PATENTS

| | | |
|---|---|---|
| 1,510,465 | Dittmar | Oct. 7, 1924 |
| 1,925,759 | Huntington | Sept. 5, 1933 |
| 2,126,506 | Rushlau et al. | Aug. 9, 1938 |
| 2,289,753 | Capstaff | July 14, 1942 |
| 2,313,606 | Webb et al. | Mar. 9, 1943 |
| 2,615,192 | Morell | Oct. 28, 1952 |